WITNESSES:
Bernard R. Gieguer
James G. Young

INVENTOR
Ralph M. Heller
BY Ernest P. Klipfel
ATTORNEY

United States Patent Office 3,423,729
Patented Jan. 21, 1969

3,423,729
ANTI-FADING ERROR CORRECTION SYSTEM

Ralph M. Heller, Baltimore, Md., assignor to Westinghouse Electric Corporation, Pittsburgh, Pa., a corporation of Pennsylvania Filed June 25, 1964, Ser. No. 377,979
U.S. Cl. 340—146.1 8 Claims
Int. Cl. G08c 25/00

ABSTRACT OF THE DISCLOSURE

An anti-fading error correction apparatus for a data transmission system wherein an encoder inserts additional bits into each word for error correcting coding and a time spread permutation device separates adjacent bits of any particular word for a time equal to the contemplated duration of a fade or error burst in the system.

Figure 1:
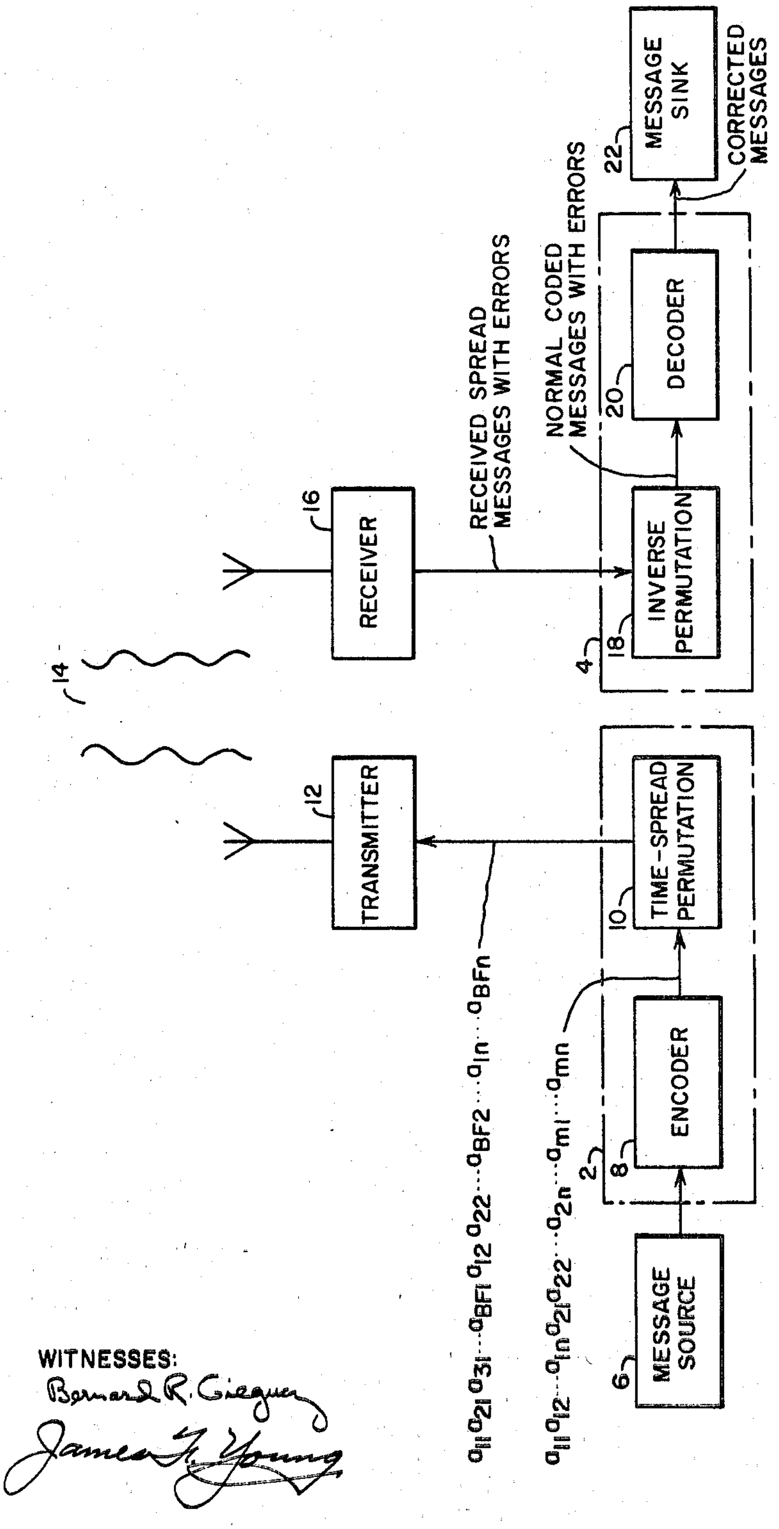

The present invention relates generally to data transmission systems and more particularly relates to an anti-fading error or clustered error correction system for the transmission of digital data.

Many communication systems must operate in an environment with fading signal levels. In scatter propagation systems, fading is considered to be caused by the mutual interference among the many components of the signal arriving at the receiver through different and independently varying paths. These paths vary because of changing density conditions in the atmosphere. The rate of fading is determined by the rate of change in these varying paths due to atmospheric changes and the wavelength of the frequency being used for transmission. Fading durations of up to five seconds are not uncommon.

Not only is fading a problem in ionospheric and tropospheric scatter systems but it is also a problem in communication systems utilizing other transmission mediums or channels, such as an electric conductor.

Errors occurring in close proximity in a channel present a similar problem as a fading channel. Adverse transmission conditions such as interference caused by thunderstorms, or lightning bursts, although of relatively short duration, can cause clustered errors or errors in close poximity.

Simple error correcting coding of the infomation offers a good improvement in the bit error rate if the errors occur randomly in the bit steam, but when the errors are correlated across complete code words the information is lost. For example, the use of simple error correcting codes can be applied on VLF channels where lightning bursts cause errors over a set of bits that is much too long for short codes alone to handle. Longer and more complex coding schemes can be used to overcome errors in close proximity but the added complications and expense of the necessary coding equipment will not completely overcome a fading channel in any event.

Other methods that can be used for overcoming fading are known but not easy to apply. A space diversity method involves the use of additional antennas and receivers. A frequency diversity scheme involves the use of a more complex transmitter-receiver system, has peak power complications and requires more bandwidth. Feedback systems request retransmission of erroneous information. The most obvious scheme is to increase the power of transmission but in high power systems the addition of five or ten decibels may not be economically feasible.

Although the long time average error-rate in a fading channel might be such that the application of simple coding would offer a good improvement in the bit error rate if the errors occurred randomly within the bit stream, the fact that the errors are correlated across the code word precludes this. As a more specific example, consider two communication channels, one subject to Gaussian noise and the other to fading of the type under consideration and both channels having a long-time average error rate of $1/100$. A simple single error-correcting code in the random error channel will reduce the long-time aveage error rate of approximately $1/1000$, which is adequate for communicating. However, the same code applied to the fading channel would only bring the error-rate down to approximately $1/200$ which would not be acceptable.

The present invention, however, allows the use of the most simple error-correcting codes to overcome fading and errors in close proximity in a transmitting channel. It is not the amount of errors that is too great for simple coding in a fading channel. It is the distribution of the errors within the code words that causes the trouble. If, still keeping the same simple code words, the pattern of errors occurring in the channel is caused to appear random across the code words, the code will realize a much greater improvement in channel error rate.

Briefly, the present invention provides apparatus and method for error-correcting coding of transmission data in combination with time-spread coding. The invention enables the use of simple codes to combat fading by transmitting the individual bits of the code word, not in succession, but separated in time by the length of expected fades. This transforms a channel with a correlated error pattern into one with random errors across the code words. The gaps between the bits of the code word are filled by bits from other code words arranged in a similar fashion.

An object of the present invention is to provide an anti-fading error correction system which is economically feasible and is simple to operate.

Another object of the present invention is to provide an anti-fading error correction system capable of overcoming fading in a channel, errors occurring in close proximity in a channel and pulse jamming of a channel even if the jammer's pulse width were much longer than several bits of the data stream.

Another object of the present invention is to provide a digital data transmission system capable of satisfactory operation in a channel having a fade varying in length up to some predetermined time duration or clustered or randomed errors, or both, within the predetermined time duration, no matter what external phenomena causes such fade or errors.

Another object of the present invention is to provide apparatus and method for anti-fading error correction in a data transmission system.

Another object of the present invention is to provide a digital data transmission system having the simplicity of implementation allowed by short low-order error-correcting codes and yet overcoming a fading channel.

Figure 2:
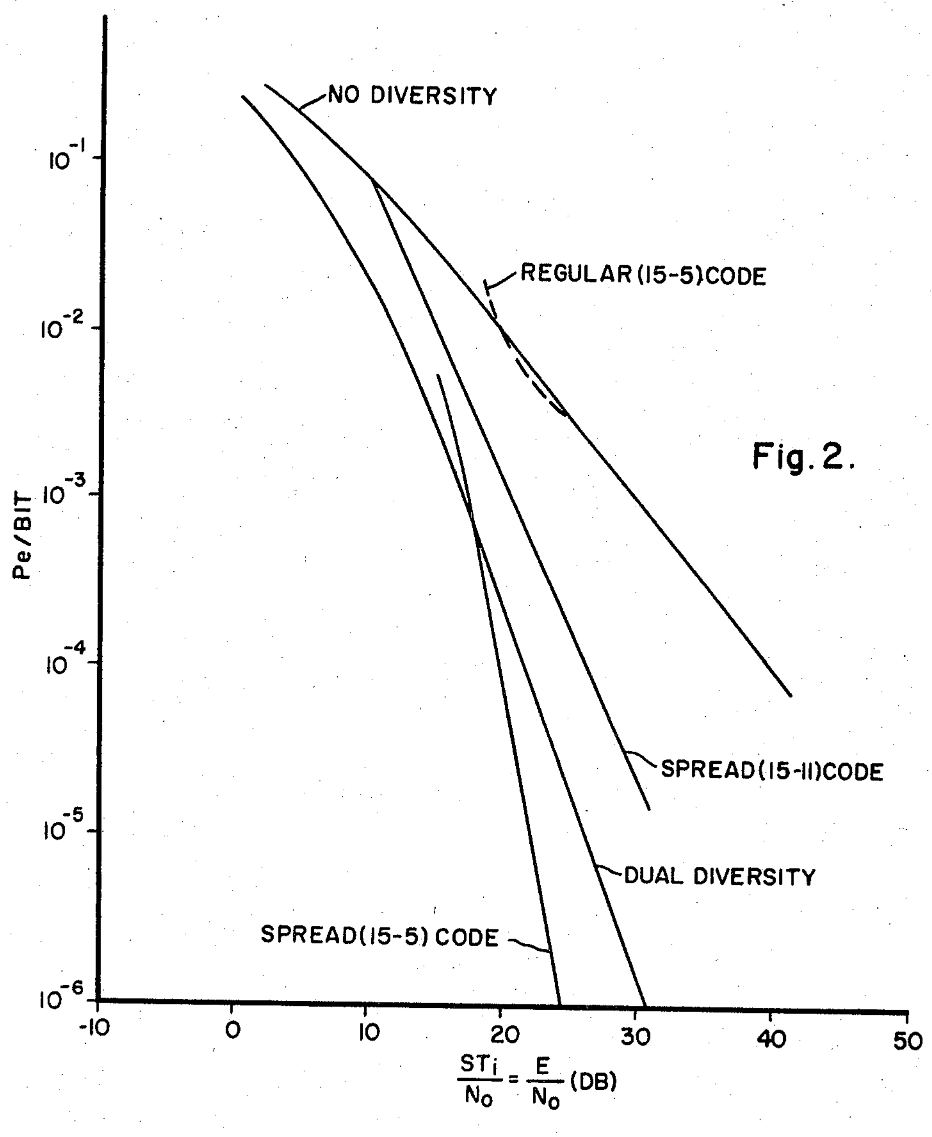

Further objects and advantages of the present invention will be readily apparent from the following detailed description taken in conjunction with a drawing in which:

FIGURE 1 is a block diagram of an illustrative embodiment of the present invention; and FIG. 2 is a graphical representation of the results attained by the operation of the present invention.

A digital-data transmission system is illustrated, including an anti-fading error correction system, as a transmitting section 2 and receiving section 4.

A message source 6 provides data to an encoder 8 which converts a message to a digital code form if not already received in digital form from the message source 6. On the other hand the message source 6 may translate the data into a time-divided sequence of pulses which are already binary in character. The encoder 8 provides error correcting coding to each word received from the message source by adding at least one bit to each word so coded. The encoder 8 error-correcting codes the message and a time-spread permutation device 10 spreads the coded messages in a manner more fully described hereinafter. A transmitter 12, having a predetermined transmission rate of a given number bits per second places the coded messages, after spreading, upon or into the transmitting medium 14.

A receiver 16 accepts the digital data from the transmission medium 14 and distributes it to the proper point in an inverse permutation device 18. The inverse permutation device 18 changes the spread messages with errors to a normal coded message still containing the errors. A decoder 20 accepts the normal coded messages with errors and provides an output of corrected messages to a message sink 22.

Since the message at the sink 22 is usually desired in the same rate as it left the message source 6, the bit transmission rate of the transmitter 12 is increased to handle the extra bits added to the message. The transmission rate is again reduced between the decoder 20 and sink 22 since the extra bits are removed after decoding.

The digital data transmission system utilizes an anti-fading error correction system employing relatively simple error-correcting coding and a form of time diversity coding. With error-correcting codes it is possible to reduce the probability of error to the degree one wishes and to transmit much more information than could be sent if the message were simply repeated. When so coding a message at least one binary bit is added to each word and a word which is error-correcting coded will hereinafter be referred to as a code word. Simple error correcting codes such as parity checks, Hamming and Bose-Chadhuri codes are well known in the art.

Let the digital-data transmission system parameters be,

B=the transmission rate in bits/sec.
$n$=the number of bits in a code word.
$T_F$=the maximum significant fade duration in seconds.

Consider a set of code words, $w_1$, $w_2$, . . . in time sequence, as $$w_1=a_{1,1}a_{2,1}a_{3,1} \ldots a_{1,n}$$
$$w_2=a_{2,1}a_{2,2}a_{2,3} \ldots a_{2,n}$$
$$\ldots\ldots$$
$$w_m=a_{m,1}a_{m,2}a_{m,3} \ldots a_{m,n}$$

At the encoder 8, the code words are constructed in the usual manner. However, instead of the transmitter 12 sending the bit stream out into the channel 14 in the usual time sequence $$a_{1,1} \ldots a_{1,n}a_{2,1} \ldots a_{2,n}a_{m,1} \ldots a_{m,n} \ldots$$

the code words will be delayed so as to permit the transmission of the following bit stream configuration:

$$a_{1,1}a_{2,1} \ldots a_{BT_F,1}a_{1,2}a_{2,2} \ldots a_{BT_F,2} \ldots a_{1,n} \ldots a_{BT_F,n}$$

This, in effect, puts $T_F$ seconds, or B times $T_F$ bits between any two bits of any code word. Thus, a burst of as many as B times $T_F$ errors in a row causes no more than one error to occur within any code word. At the inverse permutation device 16, the incoming bit stream is re-ordered and then decoded in the usual fashion for simple codes. The errors caused by the fade of $T_F$ seconds are eliminated.

If an $e$ error-correcting code were used instead of a single error-correcting code, then either a fade duration of $e$ times B times $T_F$ bit times could be tolerated, or $e$ fades over $BT_F$ bit times each would be corrected. Also, the extra error-correction capability might be utilized by shortening the delay between bits of the code word to $T_F/e$ seconds.

The improvement to be gained by time-spread coding for single error-correcting coding of the 15 bit code word and for a (15, 5) triple error-correcting code is shown in FIG. 2. The probability of error per bit fading, *Pe/Bit*, is based on all transmissions being at the same information bit rate and the same transmitter power. Different actual bit transmission rates for the systems is a necessity but it should be noted that the improvement obtained by time-spread coding is significant and compares favorably with double space diversity.

Referring to FIG. 1, and assume a 10 bit, 2 Teletype character, information input from the message source 6 to the encoder 8. The encoder 8 operates on the 10 bit information input and adds 4 code bits to produce a 14 bit coded word which goes to the time permutation device 10. Of course, any simple low-order error-correcting code can be used to expand a predetermined number of bits information input and Teletype is selected solely for illustration. An encoder of any conventional design within the skill of the art may be used. Many are available to suit particular low-order error-correcting codes which add code bits to the information coming into the encoder.

The time spread permutation device 10 separates adjacent bits of a code word by a predetermined number of bits from other code words. The number of bits from other code words being preferably selected on the basis of one bit from each other code word. The number of bits being determined by the transmission rate of the transmitter 12 in bits per second for a fade in the transmitting medium 14 of predetermined time duration. Bits of other code words are arranged in a like manner in the time gaps between the bits of the aforementioned code word. The time-spread permutation device 10 may take any suitable form to accomplish this result.

One such device is as described and claimed in a copending application, now Patent No. 3,335,409, issued Aug. 8, 1967, entitled "Permutation Apparatus" R. M. Heller, A. H. Trock, J. R. Bowen and K. R. Schreiber inventors, and assigned to the present assignee, wherein a memory is capable of storing a predetermined number of code words so that their bits can be interlaced for spreading or scrambling. The number of words that can be stored in the memory is chosen to be equal to the number of bits that can be transmitted in a bit stream by the transmitter 12 (as determined by its transmission rate), during a fade of predetermined duration in the transmitting channel 14.

It can be seen that the transmitter portion 2 of the anti-fade error correcting system can be made to have a capacity for time diversity spreading sufficient for any predetermined time of fade that is desired to be overcome. For example, consider a data transmission system for a Teletype channel over scatter mediums where expected fade durations might be up to five seconds. With a system based upon a 14 bit code word, which is compatible with two 7 bit Teletype characters, the spread between adjacent bits of any code word would be 224 bits which corresponds to approximately five seconds fade at the normal slow Teletype rates.

The inverse permutation device 18 is similar to the time-spread permutation device 10 but the storage takes the scrambled bit stream and holds it so that the error-correcting code words can be reformed for decoding. The decoder 20 paired with the encoder 8 will correct the messages for transmission to the message sink 22.

It should now be readily apparent that the application of the present invention is by no means limited to fading channels. Time-spread coding can be applied to any channel where the distribution of errors along the bit stream tends to be clustered. Although clustered errors in the channel will be randomized by the spreading technique, this does not imply that randomly distributed errors occurring in the channel will be clustered by the spreading technique. Thus, time-spread coding is also applicable to any channel that can benefit from utilizing a random error-correcting code, since it will perform as well as the code without spreading. An advantage of time-spread coding is that once put into a channel, provided that the average number of errors occurring within a segment of $n$ times B times $T_F$ bits is within its capabilities, it will correct for almost all of them whether they are clustered or random or both, no matter what external phenomena caused them.

While the present invention has been described with a degree of particularity for the purposes of illustration, it is to be understood that all alterations, modifications in the equivalence within the spirit and scope of the present invention are herein meant to be included. Depending upon the particular manner in which a designer might build the permuter 10, there could be some variation in the actual order in which all the bit ones are assembled. For example, the bit ones might go $A_{11}$ $A_{21}$ $A_{31}$ . . . as described or $A_{11}$ $A_{31}$ $A_{51}$ . . . $A_{21}$ $A_{41}$ . . . or any other of several possible ways. Any bit ordering to achieve time spreading may be used.

An economical type of adaptive communication system can be realized by providing a bit permutator 10 to receive code words of a fixed length and then utilizing several codes of this length each with different error correcting capabilities. Depending upon the channel characteristics that are encountered any one of the codes that is needed would be directed into the bit permutator 10 and an appropriate delay selected.

I claim as my invention:

1. Anti-fading error correction apparatus for a data transmission system comprising, in combination; means for translating said data into a time-divided sequence of pulses which are binary in character; means for error correcting coding said sequence of pulses; and means for separating the adjacent pulses after being error-correcting coded with other pulses of said coded sequence for a time equal to a predetermined fade duration in the system.

2. Anti-fading error correction apparatus for a data transmission system comprising, in combination; means for translating said data into a sequence of pulses which are binary in character; means for inserting additional pulses in said sequence for error correcting coding; time spread permutation means for separating adjacent pulses which have been error corrected coded with a predetermined number of pulses related to the transmission rate of said system for a predetermined fade duration; inverse permutation means for reforming said sequence of pulses; and means for decoding said reformed sequence of pulses.

3. An anti-fading error correction system for data transmission comprising, in combination; means for translating said data into a time-divided sequence of binary bits grouped in words; means for error-correction coding each word by adding at least one bit to each word so coded; means for separating in time adjacent bits of one coded word by the predetermined duration of fade in said transmission; and means for inserting bits of other coded words arranged in a like manner in the time gaps between the bits of said one coded word.

4. An anti-fading error correction system for data transmission in words, each of a time-divided sequence of binary bits comprising, in combination; error-correcting coding means for changing each word to a code word having at least one additional binary bit; and means for time-spread coding said error correcting code word so that a similarly located bit in each code word is transmitted before the next similarly located bit in each code word is transmitted; said last mentioned means transmitting a number of code words equal to the number of bits which will be transmitted during a predetermined time duration of fade.

5. In a digital data transmission system for transmitting a stream of binary bits grouped in words, the combination comprising, means for coding each word into a code containing error-correcting capability; and means for arranging adjacent each other in the stream of binary bits the like ordinal number bit of each code word of a number of code words with each subsequent ordinal number bit of each code word of said number of code words subsequentially arranged in the same manner in the bit stream; said last mentioned means transmitting a number of words equivalent to the number of bits that can be transmitted at the transmission rate of the system during a fade of predetermined duration.

6. In a digital data transmission system of the sequential pulse code type for transmitting a stream of binary bits grouped in words in a channel, the combination comprising; means for error-correcting coding each word into a code word; means for separating adjacent bits of one code word in time by the expected duration of fade in said channel; and means for inserting bits of other code words arranged in a like manner in the time gaps between the bits of said one code word.

7. A system for transmitting digital data through a transmitting medium comprising, in combination; a message source; an encoder for error-correcting coding said message into code words of binary bits; a code spreader for separating adjacent bits of a code word by a bit from each of a predetermined number of code words; a transmitter for placing a stream of time divided sequential bits arranged by said encoder and said code spreader into said transmitting medium at a predetermined transmission rate; said predetermined number of code words being chosen to be equivalent to the number of bits that can be transmitted at said transmission rate during a fade of predetermined duration; a receiver for accepting said stream of bits from said transmitting medium; an inverse code spreader for gathering each adjacent bit of a code word accepted by said receiver; a decoder operatively connected to said inverse code spreader for decoding each code word; and a message sink accepting each decoded code word from said decoder.

8. A system for transmitting a message through a transmitting medium subject to a fade of predetermined time duration comprising, in combination; means for error correction coding said message into a group of code words of binary bits; and means for changing the lineal order of the bits of said group of code words so that a binary bit of each word is transmitted before a second binary bit of each word is transmitted; said last mentioned means transmitting a number of words in said group functionally related to the system transmission rate of the binary bits and the time duration of an expected fade in said medium.

References Cited

UNITED STATES PATENTS

| | | | |
|---|---|---|---|
| 2,744,960 | 5/1956 | Greefkes et al. | 179—15 |
| 3,040,128 | 6/1962 | McAdams | 178—50 |
| 3,093,707 | 6/1963 | Nicholson et al. | 178—23 |
| 3,335,409 | 8/1967 | Heller et al. | 340—172.5 |
| 3,114,130 | 12/1963 | Abramson | 340—146.1 |
| 3,065,302 | 11/1962 | Kaneko | 179—15 |
| 3,065,303 | 11/1962 | Kaneko | 179—15 |

OTHER REFERENCES

Peterson: Error Correcting Codes, MIT Press, 1961, pp. 1–5 and 60–63.

MALCOLM A. MORRISON, *Primary Examiner.*

C. E. ATKINSON, *Assistant Examiner.*

U.S. Cl. X.R.

325—41; 179—15